United States Patent
Chung et al.

(10) Patent No.: US 9,868,849 B2
(45) Date of Patent: Jan. 16, 2018

(54) COLORED RESIN COMPOSITION EXHIBITING PLEOCHROISM, AND MOLDED PLASTICS MANUFACTURED USING SAME

(75) Inventors: Hyoung Joo Chung, Uiwang-si (KR); Jae Kyung Kim, Uiwang-si (KR); Eun Ju Song, Uiwang-si (KR); Young Bae Lee, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 526 days.

(21) Appl. No.: 14/376,229

(22) PCT Filed: Aug. 3, 2012

(86) PCT No.: PCT/KR2012/006183
§ 371 (c)(1),
(2), (4) Date: Aug. 1, 2014

(87) PCT Pub. No.: WO2013/115443
PCT Pub. Date: Aug. 8, 2013

(65) Prior Publication Data
US 2014/0374676 A1    Dec. 25, 2014

(30) Foreign Application Priority Data

Feb. 3, 2012  (KR) .................. 10-2012-0011186
Jul. 30, 2012 (KR) .................. 10-2012-0083083

(51) Int. Cl.
| | |
|---|---|
| *G02B 5/23* | (2006.01) |
| *C08K 5/3465* | (2006.01) |
| *C09B 23/10* | (2006.01) |
| *C09B 45/22* | (2006.01) |
| *C08K 5/00* | (2006.01) |
| *C09B 1/32* | (2006.01) |
| *C09B 5/14* | (2006.01) |
| *C08K 5/18* | (2006.01) |
| *C08K 5/3445* | (2006.01) |
| *C09B 67/22* | (2006.01) |
| *C09B 67/20* | (2006.01) |
| *C08K 5/3437* | (2006.01) |

(52) U.S. Cl.
CPC .......... *C08K 5/3465* (2013.01); *C08K 5/0041* (2013.01); *C08K 5/18* (2013.01); *C08K 5/3437* (2013.01); *C08K 5/3445* (2013.01); *C09B 1/325* (2013.01); *C09B 5/14* (2013.01); *C09B 23/105* (2013.01); *C09B 45/22* (2013.01); *C09B 67/0041* (2013.01); *C09B 67/0061* (2013.01)

(58) Field of Classification Search
USPC ............................................ 252/586, 301.16
See application file for complete search history.

(56) References Cited

U.S. PATENT DOCUMENTS

| | | | |
|---|---|---|---|
| 5,232,634 A | 8/1993 | Sawada et al. | |
| 7,655,306 B2 * | 2/2010 | Lee ................ | C09B 1/201 359/885 |
| 2007/0290172 A1* | 12/2007 | Momose ............. | C08J 3/226 252/301.16 |
| 2012/0139781 A1 | 6/2012 | Jeong et al. | |

FOREIGN PATENT DOCUMENTS

| | | |
|---|---|---|
| JP | 2001334814 | * 12/2001 |
| JP | 2005-132970 A | 5/2005 |
| KR | 10-0157048 B1 | 11/1998 |
| KR | 2006-55631 A | 5/2006 |
| KR | 10-2007-0113077 A | 11/2007 |
| KR | 2010-121494 A | 6/2012 |
| WO | 2013/115443 A1 | 8/2013 |

OTHER PUBLICATIONS

International Search Report in counterpart International Application No. PCT/KR2012/006183 dated Feb. 18, 2013, pp. 1-6.

* cited by examiner

*Primary Examiner* — Monique R Peets
(74) *Attorney, Agent, or Firm* — Additon, Higgins & Pendleton, P.A.

(57) ABSTRACT

The present invention relates to a coloring resin composition exhibiting pleochroism comprising 100 parts by weight of a transparent thermoplastic resin (A); 0.01 to 0.03 parts by weight of a dye for coloring a resin (B) which is one selected from the group consisting of an azo-based dye (b1), an anthraquinone-based dye (b2), and a methine dye (b3); and 0.1 to 0.3 parts by weight of a functional black dye (C) obtained by mixing an anthraquinone-based dye (c1) and a perinone-based dye (c2). A resin molded article manufactured by the coloring resin composition exhibiting pleochroism of the present invention is characterized by exhibiting different colors of light according to thicknesses although the resin molded article is irradiated with light sources in a single wavelength.

10 Claims, 5 Drawing Sheets

COLORED RESIN COMPOSITION EXHIBITING PLEOCHROISM, AND MOLDED PLASTICS MANUFACTURED USING SAME

CROSS-REFERENCE TO RELATED APPLICATIONS

This application claims priority to and the benefit of International Application No. PCT/KR2012/006183, filed Aug. 3, 2012, which published as WO 2013/115443 on Aug. 8, 2013, Korean Patent Application No. 10-2012-0011186, filed in the Korean Intellectual Property Office on Feb. 3, 2012, and Korean Patent Application No. 10-2012-0083083, filed in the Korean Intellectual Property Office on Jul. 30, 2012, the entire disclosure of each of which is incorporated herein by reference.

FIELD OF THE INVENTION

The present invention relates to a coloring resin composition exhibiting pleochroism. More specifically, the present invention relates to a coloring resin composition for manufacturing a molded article which makes transmitted light have different exhibited colors according to thicknesses of the molded article in case of irradiation with light sources in a single wavelength.

BACKGROUND OF THE INVENTION

The age of a panchromatic light emitting diode (LED), called as the revolution of light, has come, and the application range thereof is widening to new fields day by day. Especially, an LED, as a light source, is applied to a wide range of technical fields such as computers, mobile phones, automobiles, and the likes and thus interest on the material filed of color filters related to the LED increases as well.

As a method for adjusting the color of light using an LED light source, there are a method for exhibiting colors by applying properties to a light source itself such as the color temperature/color rendering/power efficiency of the light source, a method for applying a specific color by combining a fluorescent substance in the sealing material of an LED package, and a method for making the LED light source to transmit a color filter and adjusting the color and the size of light according to the properties of the color filter.

Conventionally, LEDs used for lighting are classified into pure white, natural white, and warm white LEDs. The pure white LEDs emit light with color temperature between 5,000 K and 8,000 K (wherein, when an object emits light, the color temperature represents the temperature of a black body which has the same light as that of the object). The natural white LEDs emit light with color temperature between 3,500 K and 4,500 K. The warm white LEDs emit light with color temperature between 2,500 K and 3,500 K. Those LEDs are realized by mainly combining a YAG-based yellow fluorescent substance with a blue LED emitting blue light in the band of 450 nm to 480 nm, and have spectral properties with the highest peak power in the vicinity of a blue spectral region (450 nm to 480 nm) and high peak power successively in a green spectral region (520 nm to 580 nm) and a red spectral region (610 nm to 680 nm).

The fluorescent substance basically has a function which converts blue light into green color or red color, and thus the pure white LEDs have the highest power efficiency and the warm white LEDs have the lowest power efficiency. Generally, natural white LEDs have about 85% of light power compared to that of the pure white LEDs, and power efficiency of the warm white LEDs is about 75% lower than that of the pure white LEDs.

Meanwhile, power efficiency can be reduced when the concentration of the fluorescent substance is adjusted to increase light of a red spectral region for increasing color rendering index representing color reproduction fidelity of lighting light. Generally, it is required that light of a red region has to be secured as much as possible by sufficiently adjusting the concentration of fluorescent substances used for LEDs in order to make the warm white LEDs have color rendering index of 85 to 90 or more. In this case, the power efficiency becomes reduced as much as about 10 to 15% compared to warm white or natural white LEDs with color rendering index of 70 to 80.

Further, conventional LED lighting devices have been used in the manner that an array based on three kinds of LEDs, pure white/natural white/warm white LEDs, is installed in an LED lamp in order to selectively realize a variety of color temperatures such as pure white/natural white/warm white; the natural white and warm white LEDs are turned off when a user needs a pure white LED; the pure white and warm white LEDs are turned off when the user needs a natural white LED; and the pure white and natural white LEDs are turned off when the user needs a warm white LED. In this case, however, the quantity of LEDs used for the lighting devices is tripled compared to an LED lighting device exhibiting a single color, and thus it causes high costs. Further, power efficiency becomes reduced since quantity of light at a vicinity of a green region (500 nm to 550 nm) occupying the major part of the entire quantity of light is reduced in addition to that in a blue region (420 nm to 480 nm) when light of the blue region is reduced and quantity of light in a red region is relatively increased by using a conventional Hi-pass filter for realizing high color rendering index and selective color temperature of the LED lightings.

As a method for changing the color of light by adjusting and converting light properties such as wavelengths or light intensity of LED light sources, there can be a method for combining a fluorescent substance or a color filter with a sealing material. As a coloring dye of the fluorescent substance or the color filter, an anthraquinone dye is used for changing light properties as Korean patent publication No. 2006-55631 and Korean patent publication No. 2010-121494. When the color of light is converted, however, it still has problems of reducing the intensity of a light source, adjusting the contrast thereof by gradation, and converting the intrinsic color of the light source into a specific single color, even in case of converting the color into a different color.

TECHNICAL SUBJECT

The present invention provides a coloring resin composition exhibiting pleochroism which makes transmitted light have different exhibited colors according to thicknesses of a molded article in case of irradiation with light sources in a single wavelength.

The present invention also provides a coloring resin composition exhibiting pleochroism having superior concealment and aesthetic sensibility, and a molded article of the same.

The above-mentioned objectives and other objectives of the present invention can be achieved by the present invention described the following.

SUMMARY OF THE INVENTION

The present invention provides a molded article which makes transmitted light satisfy the following Mathematical Formula 1 or Mathematical Formula 2 in case of irradiation with light sources in a single wavelength:

$$\text{Abs }(X) = X_1 - X_2 > 0.05 \qquad \text{[Mathematical Formula 1]}$$

$X_1$= value of a CIE 1931 color space for the resin molded article with a thickness of 1.0 mm $X_2$= value of a CIE 1931 color space for the resin molded article with a thickness of 1.5 mm Abs $(Y)=Y_1-Y_2>0.05$     [Mathematical Formula 2]

$Y_1$=y value of a CIE 1931 color space for the resin molded article with a thickness of 1.0 mm $Y_2$=y value of a CIE 1931 color space for the resin molded article with a thickness of 1.5 mm As one specific embodiment of the prevent invention, a resin molded article can be prepared by a coloring resin composition comprising a transparent thermoplastic resin; a dye for coloring a resin (B) which is one selected from the group consisting of an azo-based dye (b1), an anthraquinone-based dye (b2), and a methine-based dye (b3); and a functional black dye (C) obtained by mixing an anthraquinone-based dye (c1) and perinone-based dye (c).

The coloring resin composition can comprise 0.01 to 0.10 parts by weight of the dye for coloring a resin (B) which is one selected from the group consisting of the azo-based dye (b1), the anthraquinone-based dye (b2), and the methine-based dye (b3); and 0.1 to 1.0 parts by weight of the functional black dye (C) obtained by mixing the anthraquinone-based dye (c1) and the perinone-based dye (c).

The transparent thermoplastic resin can have transmissivity of 85% or more.

The azo-based dye (b1) can be a compound comprising a chemical structure of the following Chemical Formula 1:

[Chemical Formula 1]

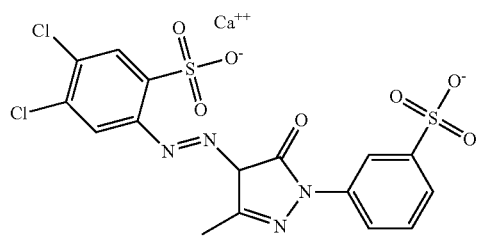

The anthraquinone-based dye (b2) can be a compound comprising a chemical structure of the following Chemical Formula 2:

[Chemical Formula 2]

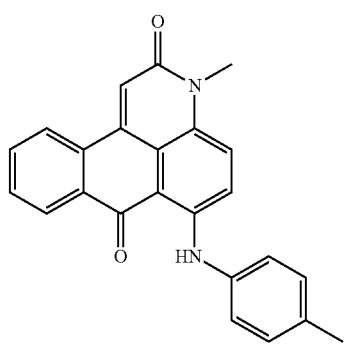

The methine-based dye (b3) can be a compound comprising a chemical structure of the following Chemical Formula 3:

[Chemical Formula 3]

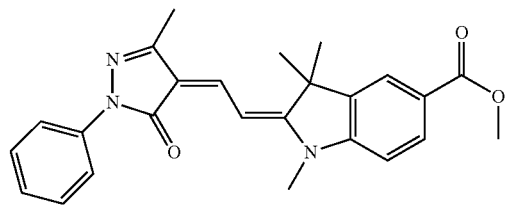

The anthraquinone-based dye (c1) can be a compound comprising a chemical structure of the following Chemical Formula 4:

[Chemical Formula 4]

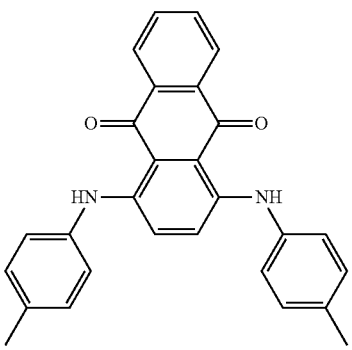

The perinone-based dye (c2) can be a compound comprising a chemical structure of the following Chemical Formula 5:

[Chemical Formula 5]

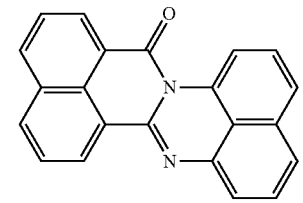

The functional black dye (C) can be obtained by mixing 20 to 70% by weight of the anthraquinone-based dye (c1) and 30 to 80% by weight of the perinone-based dye (c2).

As another specific embodiment, the resin molded article can be a resin molded article whose thickness varies in a stepwise manner by forming one or more stepped parts.

As another specific embodiment, the resin molded article can be a resin molded article whose width between one side and opposite side of the molded article continuously varies.

Other details of the specific embodiments of the present invention are included in below detailed description.

EFFECT OF THE INVENTION

The present invention can provide a coloring resin composition that can have effects on pleochroism, superior concealment and aesthetic sensibility, wherein the pleochroism makes the exhibited colors of transmitted light different according to the thicknesses of a molded article in case of irradiation with light sources in a single wavelength.

DETAILED DESCRIPTION OF THE INVENTION

The present invention relates to a coloring resin composition exhibiting pleochroism comprising 100 parts by weight of a transparent thermoplastic resin (A); 0.01 to 0.10 parts by weight of a dye for coloring a resin (B) which is one selected from the group consisting of an azo-based dye (b1), an anthraquinone-based dye (b2), and a methine-based dye (b3); and 0.1 to 1.0 parts by weight of a functional black dye (C) obtained by mixing an anthraquinone-based dye (c1) and a perinone-based dye (c2).

Figure 1:
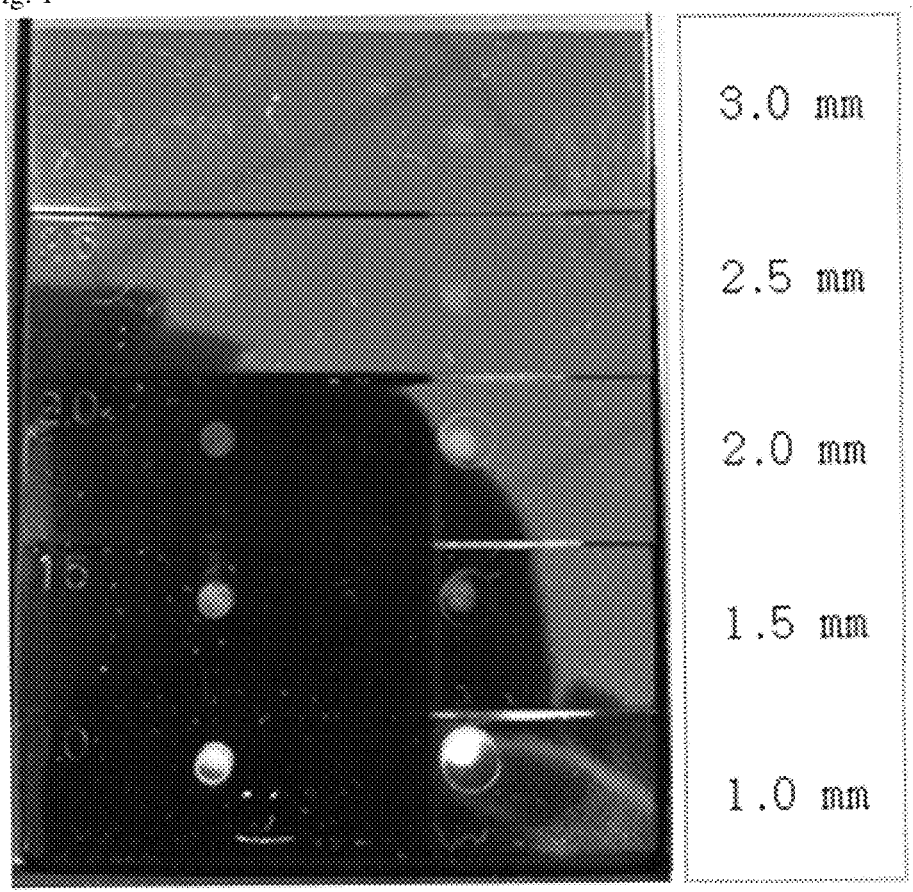
FIG. 1 is an image showing that the exhibited figure of pleochroism according to thicknesses of molded articles manufactured by a coloring resin composition of the present invention.

A resin molded article manufactured by a coloring resin composition for exhibiting pleochroism of the present invention is characterized in that exhibited colors of light are different according to thicknesses of the molded article in case of irradiation with light sources in a single wavelength. Referring to the FIG. 1, the FIG. 1 successively shows 5 kinds of resin molded articles with different thicknesses. Although the thicknesses of the resin molded articles are different, they are manufactured by the same resin composition. Physical properties thereof are the same, but, for optical properties, exhibited colors of transmitted lights are drastically different according to the thicknesses of the resin molded articles in case of irradiation with the same LED light source (750 mA, 1/T time: 500 ms$^1$) as shown on the FIG. 1.

Hereinafter, the present invention will be specifically described.

(A) Transparent Thermoplastic Resin

A transparent thermoplastic resin can be used as a base resin for the coloring resin composition exhibiting pleochroism of the present invention. As the transparent thermoplastic resin, acrylonitrile-butadiene-styrene (ABS), acrylonitrile-styrene (SAN), polycarbonate, polymethyl methacrylate, and the likes can be exemplified. Further, a coloring dye and a function black dye, used together with the base resin, do not influence on the original properties of the base resin, and thus a thermoplastic resin adequate for securing the desired properties of a resin molded article can be selected and variously used.

As an example, polyethylene terephthalate (PET) can be selected and used as a transparent thermoplastic resin for a display filter such as a perfectly flat computer monitor, a cathode ray tube (CRT) display, a liquid crystal display (LCD), a plasma display panel (PDP), and the likes in order to secure heat-resistance and electrical properties. Further, a variety of thermoplastic resins can be selected to secure the glossiness, wear properties, and scratch resistance of a molded article, but the selected thermoplastic resins are preferably transparent thermoplastic resins with transmissivity of 85% or more. When the transmissivity thereof is less than or equal to 85%, a problem which is difficult to exhibit pleochroism, the objective of the present invention, can be encountered.

(B) Dye for Coloring a Resin

As the dye for coloring a resin of the present invention, approximately, an azo-based dye (b1), an anthraquinone-based dye (b2), and a methine-based dye (b3) can be used.

The azo-based dye (b1) is preferably a compound comprising the chemical structure of the following Chemical Formula 1.

[Chemical Formula 1]

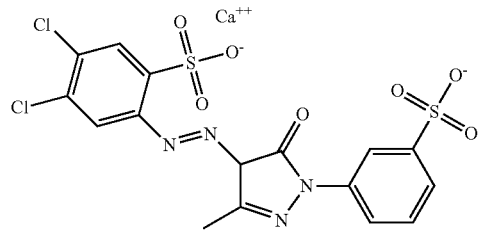

The anthraquinone-based dye (b2) is preferably a compound comprising the chemical structure of the following Chemical Formula 2.

[Chemical Formula 2]

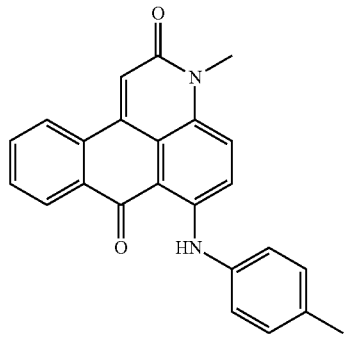

The methine-based dye (b3) is preferably a compound comprising the chemical structure of the following Chemical Formula 3.

[Chemical Formula 3]

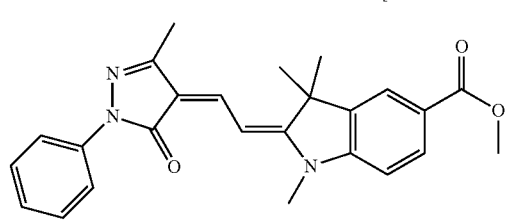

Figure 2A:
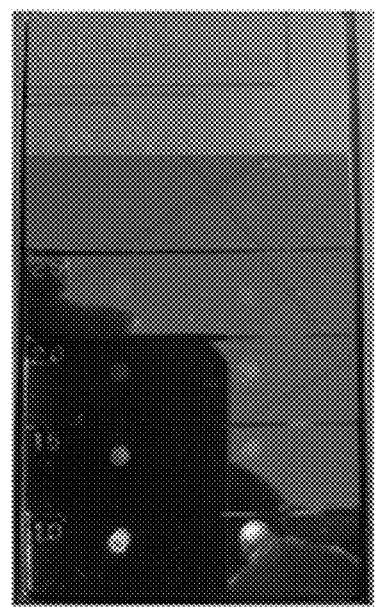
FIG. 2 (a), (b), (c) are images showing that the figures of a resin molded article exhibiting a variety of colors from light sources in a single wavelength when an azo-based dye, an anthraquinone-based dye, and a methine-based dye are respectively used as a dye for coloring a resin.
Figure 2B:
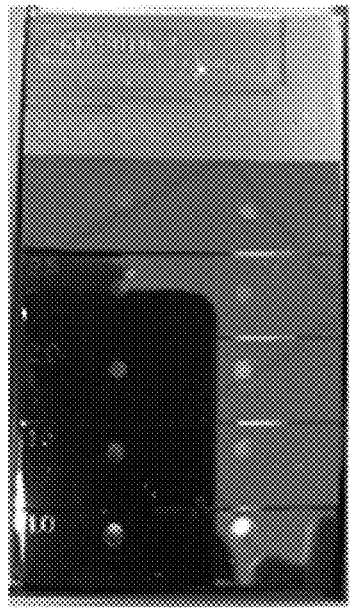
Figure 2C:
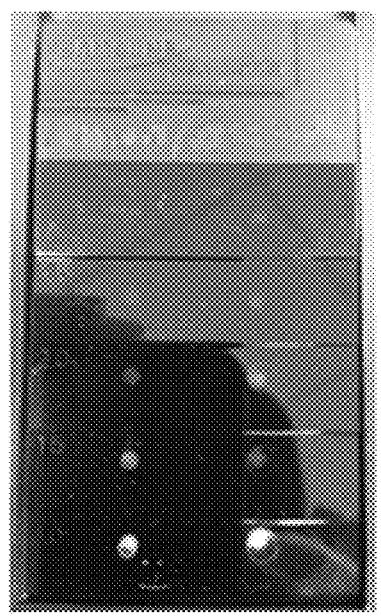

The FIG. 2 (a), (b), (c) show figures of a resin molded article exhibiting a variety of colors based on light sources in a single wavelength when the azo-based dye (b1), the anthraquinone-based dye (b2), and the methine-based dye (b3) are respectively used as a dye for coloring a resin.

The amount of the dye for coloring a resin (B) is 0.01 to 0.10 parts by weight, preferably 0.01 to 0.03 parts by weight, more preferably 0.015 to 0.025 parts by weight based on 100 parts by weight of the transparent thermoplastic resin. When the amount of the dye for coloring a resin is out of the above range, color exhibition and pleochroism exhibition cannot be easily performed.

(C) Functional Black Dye

In the present invention, the anthraquinone-based dye (c1) and the perinone-based dye (c2) are mixed and used as the functional black dye. The composition of the functional black dye is composed by mixing 20 to 70% by weight of the anthraquinone-based dye (c1) and 30 to 80% by weight of the perinone-based dye (c2).

In the functional black dye of the present invention, the anthraquinone-based dye (e1) is preferably a compound comprising the structure of the following Chemical Formula 4, and the perinone-based dye (c2) preferably comprises the structure of the following Chemical Formula 5.

[Chemical Formula 4]

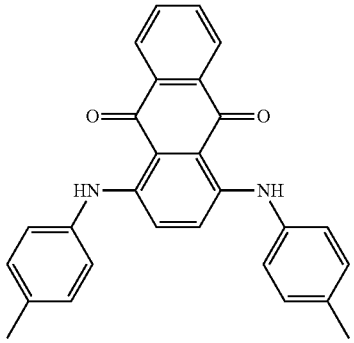

[Chemical Formula 5]

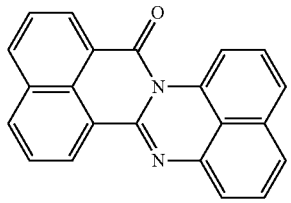

The functional black dye (C) can be used in 0.1 to 1.0 parts by weight, preferably in 0.1 to 0.3 parts by weight, more preferably in 0.15 to 0.25 parts by weight based on 100 parts by weight of the transparent thermoplastic resin (A). When the amount of the functional black dye is out of the above-mentioned range according to thicknesses of resin molded articles, color exhibition and pleochroism exhibition cannot be easily performed.

The molded article manufactured by the coloring resin composition exhibiting pleochroism of the present invention exhibits a variety of colors according to thicknesses in case of irradiation with light sources in a single wavelength. The molded article satisfies the following Mathematical Formula 1 in one specific embodiment, and the molded article satisfies the following Mathematical Formula 2 in another specific embodiment. If the following Abs (X) or Abs (Y) value increases, exhibited color difference can visually highly increase. Especially, when the Abs (X) or Abs (Y) value of the following Mathematical Formulas 1 and 2 is more than 0.05, preferably more than or equal to 0.10, more preferably more than or equal to 0.15, pleochroism exhibition, the objective of the present invention, can be possible.

$$\text{Abs } (X) = X_1 - X_2 > 0.05 \quad \text{[Mathematical Formula 1]}$$

$X_1$ = value of a CIE 1931 color space for the molded article having a thickness of 1.0 mm $X_2$ = value of a CIE 1931 color space for the molded article having a thickness of 1.5 mm $$\text{Abs } (Y) = Y_1 - Y_2 > 0.05 \quad \text{[Mathematical Formula 2]}$$

$Y_1$ = y value of a CIE 1931 color space for the molded article having a thickness of 1.0 mm $Y_2$ = y value of a CIE 1931 color space for the molded article having a thickness of 1.5 mm The resin molded article manufactured by the coloring resin composition of the present invention can be manufactured as products with a variety of shapes according to the purpose of use. The present invention has superior economical properties in terms that colors of transmitted light can be varied according to thicknesses of molded articles, although coloring resin compositions based on the same composition are used; and can be used in a variety of fields. However, in order to vary color of transmitted light into a variety of colors based on light sources in a single wavelength, that is to perform pleochroism exhibition, molded articles are preferably manufactured to have continuous or incontinuous change in thickness.

In one specific embodiment, a resin molded article manufactured based on the coloring resin composition of the present invention can be a flat type molded article whose thickness can vary in a stepwise manner by forming one or more stepped parts. Referring to the FIG. 1, when thicknesses of the flat type molded article vary into 1.0, 1.5, 2.0, 2.5, and 3.0 mm in a stepwise manner, even the same point source makes a variety of colors exhibited according to the thicknesses. Further, when a surface light source is used instead of the point source as necessary, a variety of colors of surface light emitting effect can be obtained.

Figure 4:
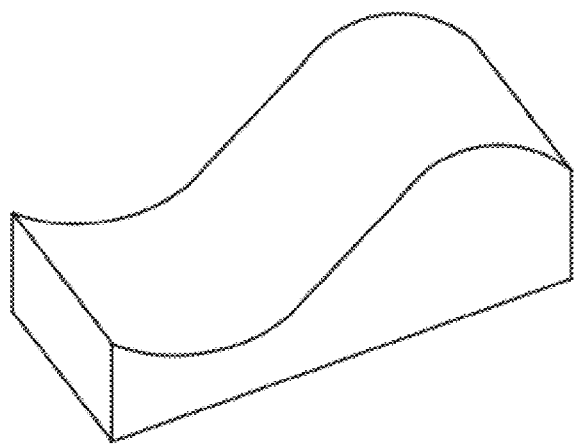
FIG. 4 is one specific embodiment of a resin molded article manufactured by a coloring resin composition of the present invention and shows a perspective view of a molded article whose cross section forms a wave pattern by forming one or more curved parts on one side of the molded article.

In another specific embodiment, the resin molded article of the present invention can be a molded article whose width between one side and the opposite side thereof continuously varies. Referring to the FIG. 4, when the cross section of the molded article forms a wave pattern by forming one or more curved parts on one side of the molded article, the thickness of the molded article continuously varies, and thus color change of transmitted light showing gradating effect can be obtained even though the light sources in a single wavelength are used.

Hereinafter, preferred Examples of the present invention are described. However, the following Examples are the preferred Examples of the present invention, but not limited to the following Examples.

EXAMPLES

Definition of Each Component Used for the Examples (A) Thermoplastic Resin

A polycarbonate resin (Cheil Industries Inc. SC-1120UR) having light transmissivity of 91%, measured using a haze meter is used.

(B) Dye for Coloring a Resin (b3) Methine-Based Dye

Chemical Formula: Methyl-2-[(1,5-Dihydro-3-methyl-5-oxo-1-phenyl-4H-pyrazol-4-yidene)-ethylidene]-1,3,3-trimethylindoline-5-carboxylate CAS No: 5718-26-3

Color Index: Solvent Orange 107

(C) Functional black dye
(c1) Anthraquinone-Based Dye
Chemical Formula: 1,4-Bis(p-tolylamino)anthraquinone
CAS No: 128-80-3
Color Index: Solvent Green 3
(c2) Perinone-Based Dye
Chemical Formula: 14H-Benz[4,5]isoquino[2,1-a]perimidin-14-one
CAS No: 6829-22-7
Color Index: Solvent Red 179

Examples 1 to 4

Each of components as above are mixed based on the composition of the following Table 1 and blended, and then the mixture is introduced into a biaxial extruder (L/D=32, =30 mm). A pellet type resin composition is manufactured based on the mixture through the extruder; specimens are manufactured using a 3 oz injector at the injection temperature of 230° C.; and then resin molded articles of Examples 1 to 4 having thickness variation by 0.5 mm unit are manufactured. Average values are obtained by irradiating the manufactured color filter with an LED light source (750 mA, 1/T time: 500 ms$^1$) and repeatedly 5 times measuring the coordinate values of the CIE1931 color space of transmitted light through the specimens, the resin molded articles, under a CD method (actinography on a predetermined area) condition using a compact array spectrometer (CAS) machine. The average values of the color coordinates are shown on the following Table 2.

TABLE 1

| Item | Examples | | | |
|---|---|---|---|---|
| | 1 | 2 | 3 | 4 |
| Thickness of Specimen | 1.0 mm | 1.5 mm | 2.0 mm | 2.5 mm |
| (A) Transparent Thermoplastic Resin | 100 | 100 | 100 | 100 |
| (B) Coloring Dye | 0.02 | 0.02 | 0.02 | 0.02 |
| (C) Functional Black Dye (c1) Anthraquinone-based | 0.09 | 0.09 | 0.09 | 0.09 |
| (c2) Perinone-based | 0.11 | 0.11 | 0.11 | 0.11 |

(Unit: parts by weight)

TABLE 2

| Examples | Thickness | x Average | Abs (X) | y Average | Abs (Y) | z Average | Red Effect Average |
|---|---|---|---|---|---|---|---|
| 1 | 1.0 mm | 0.4015 | — | 0.5537 | — | 0.0448 | 11.22 |
| 2 | 1.5 mm | 0.6982 | 0.2967 | 0.3734 | 0.1803 | 0.0716 | 66.72 |
| 3 | 2.0 mm | 0.6711 | 0.0271 | 0.2768 | 0.0966 | 0.0521 | 84.86 |
| 4 | 2.5 mm | 0.6621 | 0.0090 | 0.2578 | 0.0190 | 0.0801 | 91.00 |

Figure 3A:
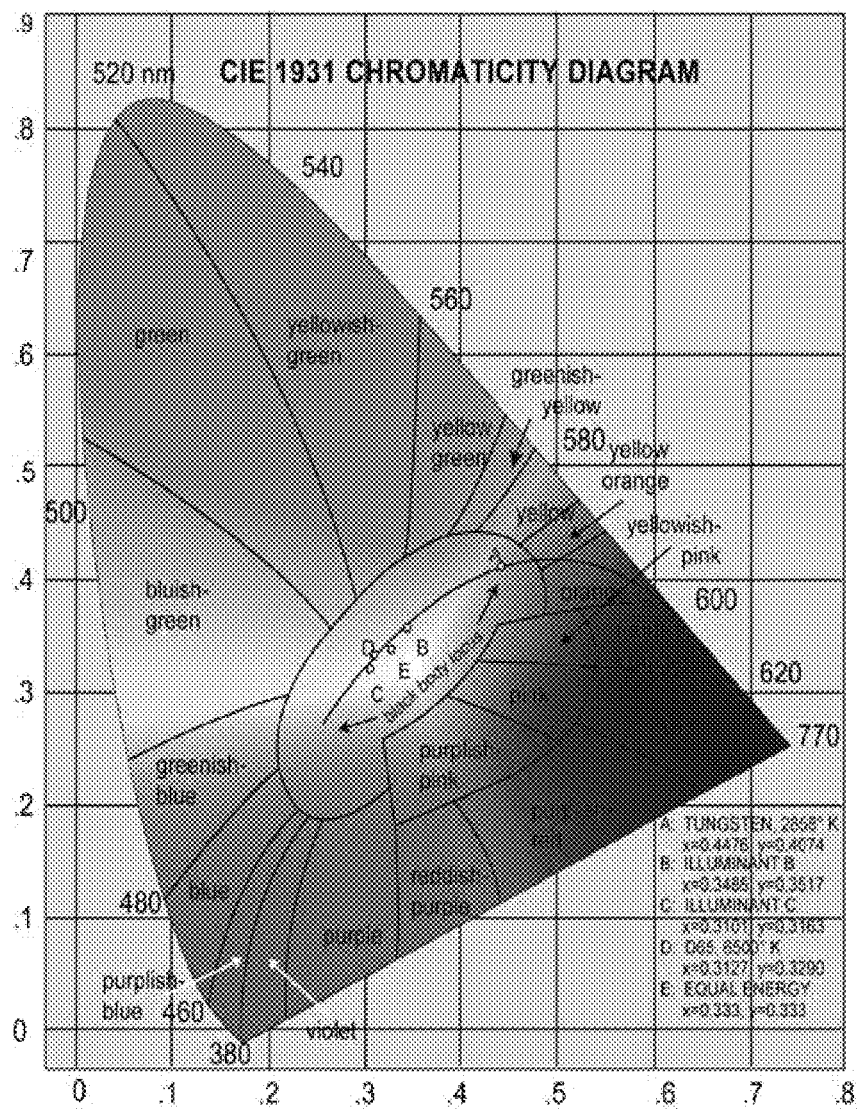
FIG. 3 (a) shows a CIE 1931 XYZ color space (or CIE 1931 color space), and FIG. 3 (b) shows the color coordinate of transmitted light through specimens of Examples 1 to 4 on the CIE 1931 color space.
Figure 3B:
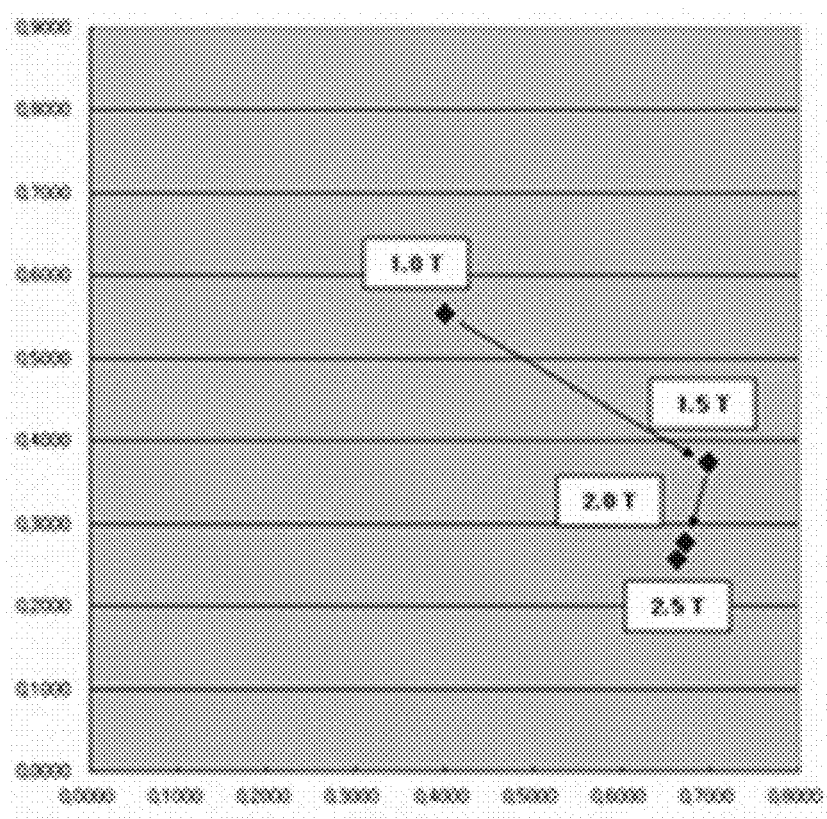

The present inventor sets a CIE 1931 XYZ color space (or CIE 1931 color space) shown on FIG. 3 (a) as the object standard in order to determine the pleochroism exhibition of the coloring resin composition exhibiting pleochroism of the present invention. The CIE 1931 color space is one of initial color spaces mathematically defined based on research on the color recognition of humans and shows pleochroism exhibited by the resin composition of the present invention in a numerical manner. FIG. 3 (b) shows the color coordinates of transmitted light through the specimens of Examples 1 to 4 on the CIE 1931 color space. It is confirmed that colors on the color space of FIG. 4 corresponding the color coordinates of Example 1 (1.0 T), Example 2 (1.5 T), Example 3 (2.0 T), and Example 4 (2.5 T) are the color exhibited by transmitted light through the specimens.

Based on Examples 1 to 4, specimens manufactured based on the coloring resin composition of the present invention exhibit a variety of colors according to thicknesses of the specimens although light sources of a single wavelength and properties transmit the specimens.

Examples are one specific embodiment of the present invention, and can have plenty of number of cases based on the combination of colors exhibited according to composition of resin compositions, properties of a light source, and thicknesses of specimens; and the application thereof does not have limitation.

Since the coloring resin composition exhibiting pleochroism of the present invention has optical properties showing pleochroism as above, it can be used in a variety of any technical fields where lighting such as a computer monitor bezel, a mobile phone, a vehicle headlight, and the likes is used without limitation and have properties exhibiting a variety of colors according to thicknesses of molded articles.

Simple modification or change of the present invention can be carried out by those who skilled in the art, and it seems that those modification or change are included in the field of the present invention.

What is claimed is:

1. A coloring resin composition comprising:
   a transparent thermoplastic resin;
   a dye for coloring a resin (B) selected from the group consisting of an azo-based dye (b1), an anthraquinone-based dye (b2), and a methine-based dye (b3), wherein the dye for coloring a resin (B) imparts a color other than black; and
   a functional black dye (C), wherein the functional black dye (C) is a mixture of an anthraquinone-based dye (c1) and a perinone-based dye (c2).

2. The coloring resin composition of claim 1, wherein the coloring resin composition comprising:
   0.01 to 0.10 parts by weight of the dye for coloring a resin (B); and
   0.1 to 1.0 parts by weight of the functional black dye (C) based on 100 parts by weight of the transparent thermoplastic resin.

3. The coloring resin composition of claim 1, wherein the transparent thermoplastic resin has transmissivity of 85% or more.

4. The coloring resin composition of claim 1, wherein the azo-based dye (b1) is a compound comprising a chemical structure of the following Chemical Formula 1, the anthraquinone-based dye (b2) is a compound comprising a chemical structure of the following Chemical Formula 2, and the methine-based dye (b3) is a compound comprising a chemical structure of the following Chemical Formula 3:

[Chemical Formula 1]

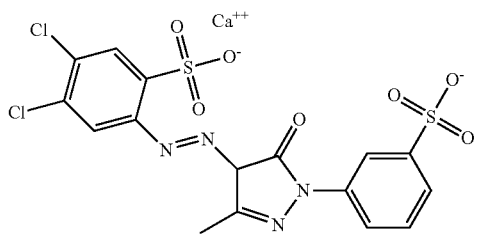

[Chemical Formula 2]

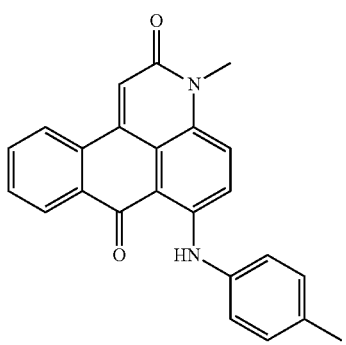

[Chemical Formula 3]

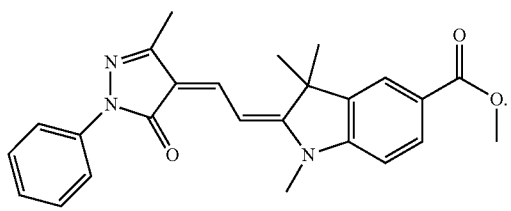

5. The coloring resin composition of claim 2, wherein the functional black dye (C) is a mixture of 20 to 70% by weight of the anthraquinone-based dye (c1) and 30 to 80% by weight of the perinone-based dye (c2).

6. The coloring resin composition of claim 5, wherein the anthraquinone-based dye (c1) is a compound comprising a chemical structure of the following Chemical Formula 4, and the perinone-based dye (c2) is a compound comprising a chemical structure of the following Chemical Formula 5:

[Chemical Formula 4]

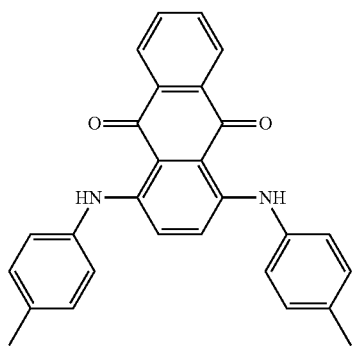

[Chemical Formula 5]

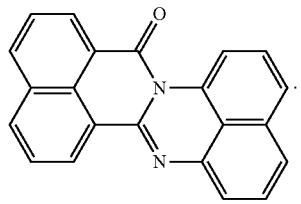

7. The coloring resin composition of claim 1, wherein a molded article formed of the composition exhibits pleochrosim wherein light transmitted through the molded article has different exhibited colors depending on the thickness of the molded article so that the molded article satisfies the following Mathematical Formula 1 or Mathematical Formula 2 when the molded article is irradiated with a light source in a single wavelength:

$$\text{Abs }(X)=X_1-X_2>0.05 \qquad \text{[Mathematical formula 1]}$$

wherein $X_1$= value of a CIE 1931 color space for the resin molded article with a thickness of 1.0 mm and $X_2$= value of a CIE 1931 color space for the resin molded article with a thickness of 1.5 mm, $$\text{Abs }(Y)=Y_1-Y_2>0.05 \qquad \text{[Mathematical Formula 2]}$$

wherein $Y_1$=y value of a CIE 1931 color space for the resin molded article with a thickness of 1.0 mm and $Y_2$=y value of a CIE 1931 color space for the resin molded article with a thickness of 1.5 mm.

8. The coloring resin composition of claim 1, wherein the dye for coloring a resin (B) is an azo-based dye (b1) having a chemical structure of Chemical Formula 1:

[Chemical Formula 1]

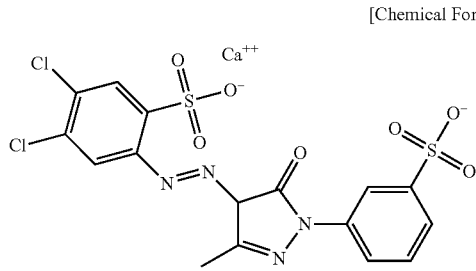

9. The coloring resin composition of claim 1, wherein the dye for coloring a resin (B) is an anthraquinone-based dye (b2) having a chemical structure of Chemical Formula 2:

[Chemical Formula 2]

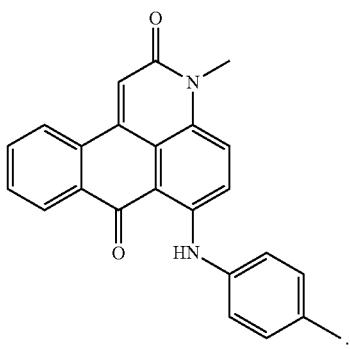

10. The coloring resin composition of claim 1, wherein the dye for coloring a resin (B) is a methine-based dye (b3) having a chemical structure of Chemical Formula 3:
[Chemical Formula 3]
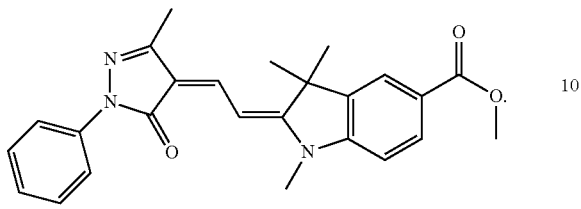

UNITED STATES PATENT AND TRADEMARK OFFICE
CERTIFICATE OF CORRECTION

PATENT NO. : 9,868,849 B2
APPLICATION NO. : 14/376229
DATED : January 16, 2018
INVENTOR(S) : Hyoung Joo Chung et al.

It is certified that error appears in the above-identified patent and that said Letters Patent is hereby corrected as shown below:

In the Specification

Column 2, delete Line 67 and insert: --Abs $(\Delta X) = | X_1-X_2 | > 0.05$ [Mathematical Formula 1]--

Column 3, delete Line 1 and insert: --$X_1 = \chi$ value of a CIE 1931 color space for the resin--

Column 3, delete Line 3 and insert: --$X_2 = \chi$ value of a CIE 1931 color space for the resin--

Column 3, delete Line 6 and insert: --Abs $(\Delta Y) = | Y_1-Y_2 | > 0.05$ [Mathematical Formula 2]--

Column 8, delete Line 4 and insert: --Abs $(\Delta X) = | X_1-X_2 | > 0.05$ [Mathematical Formula 1]--

Column 8, delete Line 5 and insert: --$X_1 = \chi$ value of a CIE 1931 color space for the molded--

Column 8, delete Line 7 and insert: --$X_2 = \chi$ value of a CIE 1931 color space for the molded--

Column 8, delete Line 9 and insert: --Abs $(\Delta Y) = | Y_1-Y_2 | > 0.05$ [Mathematical Formula 2]--

Column 9, in Table 2 delete the headings and insert:

-- Examples   Thickness   x Average   Abs $(\Delta X)$   y Average   Abs $(\Delta Y)$   z Average   Red Effect Average --

Column 9, in Table 2 delete "0.0716 under the z Average in Example 2" and insert: -- -0.0716--

In the Claims

Column 12, Claim 7, delete Line 20 and insert: --Abs $(\Delta X) = | X_1-X_2 | > 0.05$ [Mathematical Formula 1]--

Signed and Sealed this
Nineteenth Day of June, 2018

Andrei Iancu
*Director of the United States Patent and Trademark Office*

CERTIFICATE OF CORRECTION (continued)
U.S. Pat. No. 9,868,849 B2

Column 12, Claim 7, delete Line 21 and insert: --wherein $X_1 = \chi$ value of a CIE 1931 color space for the--

Column 12, Claim 7, delete Line 23 and insert: --$X_2 = \chi$ value of a CIE 1931 color space for the resin--

Column 12, Claim 7, delete Line 25 and insert: --Abs $(\Delta Y) = |Y_1 - Y_2| > 0.05$ [Mathematical Formula 2]--